(12) United States Patent
Mahler (10) Patent No.: US 10,788,878 B2
(45) Date of Patent: Sep. 29, 2020

(54) METHOD FOR OPERATING AN ELECTRICAL DEVICE, ELECTRICAL DEVICE AND SENSOR/ACTUATOR SYSTEM

(71) Applicant: BALLUFF GmbH, Neuhausen (DE)

(72) Inventor: Simon Mahler, Suberg (CH)

(73) Assignee: BALLUFF GmbH, Neuhausen (DE)

( * ) Notice: Subject to any disclaimer, the term of this patent is extended or adjusted under 35 U.S.C. 154(b) by 113 days.

(21) Appl. No.: 16/223,439

(22) Filed: Dec. 18, 2018

(65) Prior Publication Data

US 2019/0339762 A1 Nov. 7, 2019

Related U.S. Application Data

(63) Continuation of application No. PCT/EP2016/066188, filed on Jul. 7, 2016.

(51) Int. Cl.
*G06F 1/32* (2019.01)
*G06F 1/04* (2006.01)
*G06F 1/3206* (2019.01)

(52) U.S. Cl.
CPC ............ *G06F 1/3206* (2013.01); *G06F 1/04* (2013.01)

(58) Field of Classification Search
CPC ................. G06F 1/3206; G06F 1/04
See application file for complete search history.

(56) References Cited

U.S. PATENT DOCUMENTS

| 4,683,444 | A | * | 7/1987 | Kappeler | H03D 1/2236 331/25 |
| 6,047,351 | A | * | 4/2000 | Cheng | G06F 9/30058 710/260 |
| 6,534,990 | B2 | * | 3/2003 | Hocken | H02J 7/1446 324/416 |
| 2014/0013138 | A1 | | 1/2014 | Kanai et al. | |
| 2015/0185759 | A1 | | 7/2015 | Hinderer et al. | |
| 2015/0268715 | A1 | | 9/2015 | Yoshida et al. | |

FOREIGN PATENT DOCUMENTS

WO 2004012067 2/2004

* cited by examiner

*Primary Examiner* — Stefan Stoynov
(74) *Attorney, Agent, or Firm* — Lipsitz & McAllister, LLC (57) ABSTRACT

A method is provided for operating an electrical device (14) which has an operating mode and a sleep mode, in which method an oscillator apparatus (20) provides a first analog signal (f(t)) with a first frequency and second analog signal (f'(t)) with a second frequency, wherein the second analog signal (f'(t)) is different from the first analog signal (f(t)), a comparator apparatus (28) compares the first analog signal (f(t)) and/or second analog signal (f'(t)) with at least one reference value ($U_{ref}$) or a reference value range, and an interrupt signal for transferring from the sleep mode into the operating mode is produced if a certain comparison result is detected.

35 Claims, 4 Drawing Sheets

METHOD FOR OPERATING AN ELECTRICAL DEVICE, ELECTRICAL DEVICE AND SENSOR/ACTUATOR SYSTEM

This application is a continuation of international application number PCT/EP2016/066188 filed on 7 Jul. 2016 which is incorporated herein by reference in its entirety and for all purposes.

BACKGROUND OF THE INVENTION

The invention relates to a method for operating an electrical device which has an operating mode and a sleep mode.

The invention further relates to an electrical device which has an operating mode and a sleep mode.

The invention further relates to a sensor/actuator system.

SUMMARY OF THE INVENTION

In accordance with an embodiment of the invention a method is provided with which an exact timebase until the transition from a sleep mode into an operating mode may be achieved in an energy-saving manner.

In accordance with an embodiment of the invention, provision is made that an oscillator apparatus provides a first analog signal with a first frequency and second analog signal with a second frequency, wherein the second analog signal is different from the first analog signal, a comparator apparatus compares the first analog signal and/or second analog signal with at least one reference value or a reference value range, and an interrupt signal for transferring from the sleep mode into the operating mode is produced if a certain comparison result is detected.

If, for example, the electrical device is a radio sensor or radio actuator, then it does not always need to be in the operating mode. An energy-saving operation may be achieved as a result of the sleep mode. Furthermore, the electrosmog that is caused by the electrical device is reduced by providing a sleep mode.

It is necessary for an exact timebase to be present until the, in particular, regular transition from the sleep mode into the operating mode. The time until a change from the sleep mode into the operating mode should be precisely maintained in order to wake the system exactly after a certain time interval duration like, e.g., 10,000 ms. In principle, a high-frequency oscillator may be provided for this purpose. However, a constantly operated high-frequency oscillator has a relatively high power consumption.

The power consumption of a high-frequency oscillator with a clocking frequency of 8 MHz is typically on the order of magnitude of 100 μA.

In accordance with an embodiment of the invention, the oscillator apparatus provides different analog signals of a (known) first frequency and a (known) second frequency. In principle, the first frequency and the second frequency may be the same or different. The comparator apparatus may check these analog signals and, on the basis of this check, produce an interrupt signal for transferring from the sleep mode into the operating mode.

Due to the use of at least two different analog signals which, for example, may be phase-shifted in relation to each other, it results in a high precision for the timebase. Thus, for example, a high precision may be achieved also for flatter signal profiles in the presence of noise of the comparator apparatus and noise of the signal, precisely because at least two different analog signals are available.

In principle, a comparator apparatus may be constantly operated due to its relatively low power consumption (which is on the order of magnitude of 150 nA, for example).

This results in an energy-saving operation. The oscillator apparatus itself may be constantly operated in an energy-saving manner, as no high-frequency oscillator must be used, but rather a low-frequency oscillator may be used.

An exact timebase for a regular waking-up from the sleep mode into the operating mode may thus be provided with low energy consumption.

By providing the first analog signal and the second analog signal, it results in extensive setting options and control options.

It is constructively favorable if the first frequency is the same as the second frequency. This results in, among other things, simple evaluation options.

It is very particularly advantageous if the oscillator apparatus provides a clocking (timing) signal of the first frequency and/or the second frequency and in particular the clocking (timing) frequency of this clocking signal corresponds to the first frequency and the second frequency. This results in simple evaluation options. A secure timebase until the transition from the sleep mode into the operating mode may be achieved with relatively low constructive expenditure.

It is favorable if the first analog signal and the second analog signal have a sinusoidal profile. This results in simple evaluation options. In particular, upon the evaluation, a maximum edge steepness may be checked for and a declining or inclining edge may be checked for, respectively.

In one embodiment, the second analog signal is phase-shifted and in particular phase-shifted by 90° in relation to the first analog signal. This results in extensive setting options. The difference between the second analog signal and the first analog signal is provided by the phase-shift. This results in a relatively low constructive expenditure, as, in principle, the second analog signal may be produced from the first analog signal with the same frequency (and in particular a clocking frequency).

It is favorable if the first frequency and/or the second frequency is in the range between 1 kHz and 1 MHz and in particular in the range between 10 kHz and 100 kHz. This results in an energy-saving manner of operation. The oscillator apparatus may then correspondingly be constantly operated and, e.g., provide a clocking signal of the first frequency and/or the second frequency. It does not need to be switched off. For example, a clock crystal with a typical frequency of 32.768 kHz is used.

It is favorable if at the oscillator apparatus itself, the first analog signal and the second analog signal are generated or derived from a clocking signal. This results in a simple structure of the oscillator apparatus and the same may be operated in an energy-saving manner.

In one embodiment, at the oscillator apparatus, the second analog signal is produced from the clocking signal by way of an RC member. As a result, the second analog signal may be produced in a simple manner as an analog signal which is phase-shifted in relation to the first analog signal with a phase-shift of 90°.

It is favorable if the oscillator apparatus provides the clocking signal to a control unit and provides the first analog signal and the second analog signal to the control unit, wherein the control unit comprises the comparator apparatus, and in particular the control unit comprises an evaluation apparatus which is coupled to the comparator apparatus and which provides the interrupt signal. The control unit may then, without its core having to be operated, provide a corresponding exact timebase for the interrupt signal in order to obtain a transition from the sleep mode into the operating mode. Due to its very low current draw, the comparator apparatus may be constantly operated without the core of the control unit having to be operated.

In particular, the sleep mode and the operating mode of the electrical device is a sleep mode and an operating mode of the control unit and in particular the control unit provides the interrupt signal itself. The control unit is in particular a microcontroller of the electrical device which controls the electrical device itself. A defined timebase for the time of the transition from the sleep mode into the operating mode may thus be provided in a simple manner.

In one embodiment, the comparator apparatus has a first comparator for the first analog signal and a second comparator for the second analog signal, wherein in particular the first comparator and the second comparator are controlled with the same reference value or the same reference value range. This results in extensive setting options.

It is favorable if, upon reaching a threshold value or a threshold value range in the comparator apparatus, an exceeding or falling below the reference value or the reference value range is determined and/or a sign of a signal profile regarding value increase or value decrease is determined. A defined time for triggering interrupt signals for waking up the electrical device in a defined and regular manner may thus be achieved in a simple manner.

In particular, the signal steepness and/or the sign of the signal profile is taken into account for triggering an interrupt signal. A defined timebase with an energy-saving operation of the electrical device may thereby be provided.

In particular, when taking into account the signal steepness, that signal with the higher steepness used for triggering the interrupt signal. A defined triggering may be achieved as a result.

It is favorable if an evaluation phase is provided in which it is identified in the operating mode after what time the sleep mode should be transitioned into. The appropriate adjustments may then be performed.

In particular, a number of full period durations is identified in the evaluation phase. The number of full period durations may be zero or a finite natural number.

Further, it is identified whether the first analog signal and/or the second analog signal is used for a waiting time (delay time) after expiration of the identified number of full periods. This may be different in different applications.

It is further identified which sign of the signal profile is used.

Further, the at least one reference value or reference value range is determined. This may, e.g., be calculated or be identified from a look-up table.

In this context, it is sensible in principle if the reference value and the reference value range, respectively, is adjustable.

It is favorable if a control unit is configured such that an interrupt control is activated after expiration of the identified number of full periods. The number of full period durations may hereby be zero or it may be a finite natural number.

In particular, the sleep mode is transitioned into after completion of the evaluation phase. Then in particular all values which values may provide for a defined timely start of the transition from a sleep mode into an operating mode are present in a register of the control unit.

Provision is made for a control unit in the sleep mode to be activated after expiration of a determined number of period durations, wherein the use of interrupt signals is activated and the operating mode is transitioned into as a result of an interrupt signal. These operations may be carried out without a core of the control unit itself having to be activated. The activation of the use of interrupt signals means that, in principle, interrupt signals may be triggered. The actual triggering of an interrupt signal occurs when an appropriate, determined comparison result is achieved at the comparator apparatus.

In accordance with a further embodiment of the invention, in an electrical device an oscillator apparatus is provided which produces a first analog signal of a first frequency and a second analog signal of a second frequency, a control unit is provided to which a clocking signal with the first frequency and/or the second frequency is provided, a comparator apparatus is provided which compares the first analog signal and/or second analog signal with at least one reference value or reference value range, and an evaluation apparatus is provided which is coupled to the comparator apparatus and provides an interrupt signal of the transition from the sleep mode into the operating mode depending on comparison results of the comparator apparatus.

In particular, the clocking signal is that signal which clocks the control unit at its "normal operation" in the operating mode.

The manner of operation of the electric device and the corresponding advantages were already laid out in conjunction with the method in accordance with the invention.

In particular, the electrical device in accordance with an embodiment of the invention is operated with a method in accordance with an embodiment of the invention and the method in accordance with an embodiment of the invention is performed on the electrical device in accordance with an embodiment of the invention, respectively.

It is favorable if the first frequency and the second frequency are the same. This results in a constructively simpler execution.

In a constructively simple embodiment, the oscillator apparatus produces the clocking signal of the first frequency and/or the second frequency. In particular, the first frequency and the second frequency are the same, so that the oscillator apparatus produces a clocking signal of a clocking frequency, wherein the clocking frequency corresponds to the frequency of the first analog signal and the second analog signal.

It is favorable if the comparator apparatus is integrated into the control unit. This results in a compact structure, wherein an energy-saving manner of operation is practicable.

For the same reason, it is favorable if the evaluation apparatus is integrated into the control unit.

In particular, the control unit is a microcontroller which in particular has a comparator apparatus and a corresponding evaluation apparatus.

In one embodiment, provision is made for the oscillator apparatus to comprise an RC member which produces the second analog signal. That results in a simple structure of the oscillator apparatus with extensive setting options.

In an embodiment which is favorable with regard to energy consumption, the oscillator apparatus comprises an oscillator crystal for producing the clocking signal. In particular, the oscillator crystal is a low-frequency oscillator crystal.

Further, it is favorable if the comparator apparatus has a first comparator for the first analog signal and a second comparator for the second analog signal. This results in extensive setting options.

Provision may hereby be made for the first comparator and the second comparator to have the same reference value or the same reference value range.

In particular, the sleep mode and operating mode of the electrical device is a sleep mode and operating mode of the control unit.

In accordance with an embodiment of the invention, a sensor/actuator system is provided which comprises at least one electrical device in accordance with an embodiment of the invention and which is a sensor or actuator or a hub. In particular, the electrical device is controlled by way of radio and/or delivers radio signals. It is also possible, however, for all electrical devices of the sensor/actuator system or a portion of the electrical device of the sensor/actuator system to be wired. In principle, a mixture between radio components and wired components is also possible. A hub hereby constitutes a connecting apparatus for sensors and actuators, respectively, by way of which hub, e.g., a unidirectional or bidirectional communication may take place.

BRIEF DESCRIPTION OF THE DRAWINGS

The subsequent description of preferred embodiments serves in conjunction with the drawings for further explanation of the invention. In the drawings.

DETAILED DESCRIPTION OF THE INVENTION

Figure 1:
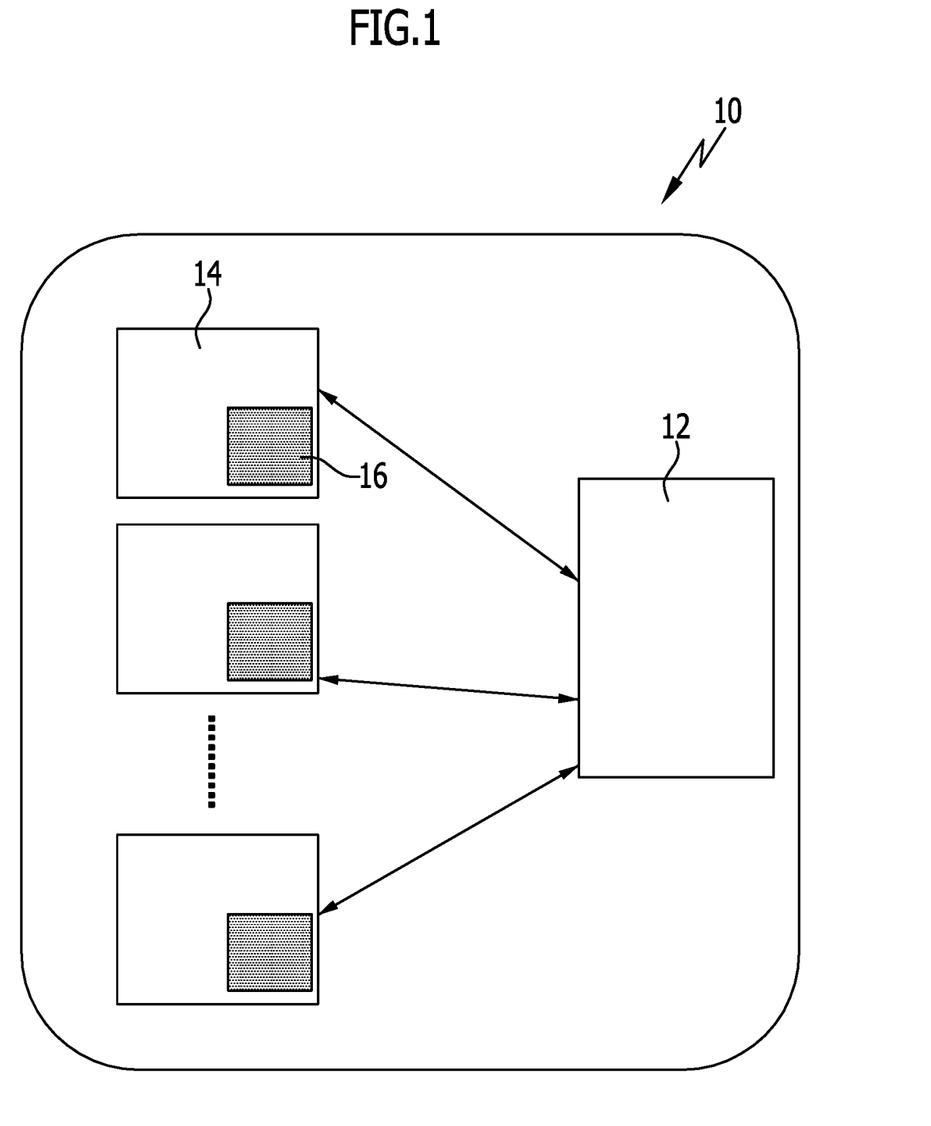
FIG. 1 shows a schematic depiction of an embodiment of a sensor/actuator system with electrical devices (sensors, actuators)

An embodiment of a sensor/actuator system, which is shown schematically in FIG. 1 and is referenced by 10, comprises a base station 12 and a multitude of electrical devices 14. An electrical device 14 is a sensor or an actuator.

A communication between a corresponding electrical device 14 and the base station 12 occurs in particular by way of radio signals which may be unidirectional or bidirectional.

If an electrical device 14 is a sensor, then at least one sensor signal transmission occurs unidirectionally from the corresponding sensor to the base station 12. A back channel is provided in the case of a bidirectional data transmission.

If an electrical device 14 is an actuator, then at least one unidirectional radio signal command transmission occurs from the base station 12 to the corresponding actuator.

The sensor/actuator system 10 may exclusively comprise one or more sensors as electrical devices 14, or exclusively comprise one or more actuators as electrical devices 14.

It is also possible for both sensors and actuators to be present.

The radio combination between electrical devices 14 and the base station 12 occurs in particular by way of a specific protocol like, e.g., by way of the IO-Link Wireless Protocol (IOLW).

An electrical device 14 comprises a (clocked) control apparatus 16. The control apparatus 16 provides for the proper operation of the electrical device 14.

With a sensor as an electrical device 14, a sensitive apparatus is coupled to the control apparatus 16.

Figure 2:
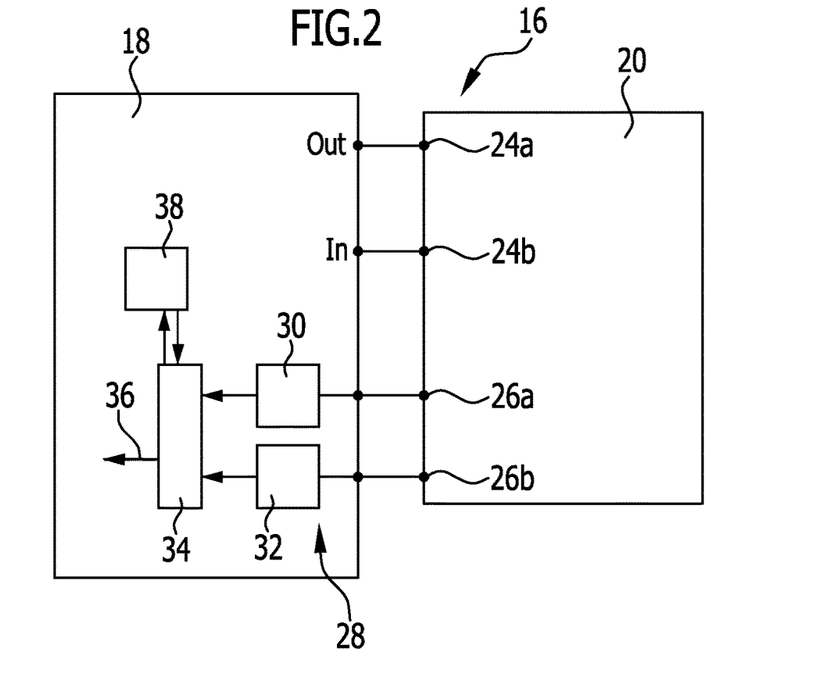
FIG. 2 shows a schematic cut depiction from an electrical device with a control unit and an oscillator apparatus.
Figure 3:
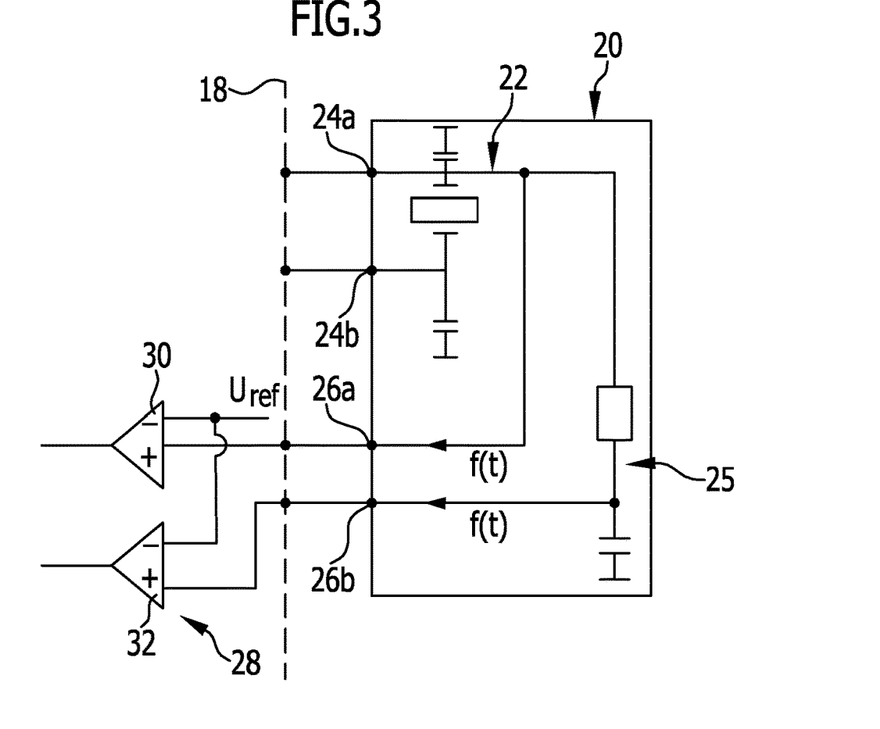
FIG. 3 shows a similar depiction to FIG. 2 with the details regarding the oscillator apparatus.

In one embodiment of an electrical device 14, the control apparatus 16 comprises a control unit 18 and an oscillator apparatus 20 (FIGS. 2, 3).

The control unit 18 is realized in particular by a microcontroller.

The oscillator apparatus 20 serves for clocking the control unit 18 by way of a clocking signal.

In one embodiment (FIG. 3), the oscillator apparatus 20 comprises an oscillator 22 which in particular is a low-frequency oscillator which has a oscillating frequency (clocking frequency) in the range between 1 kHz and 1 MHz and in particular in the range between 10 kHz and 100 kHz.

In one embodiment, the oscillator 22 comprises an oscillating crystal like, e.g., a clock crystal. The latter has a clocking frequency of 32.768 kHz, for example.

The corresponding oscillator 22 is connected to the control unit 18 by way of connectors 24a, 24b, in order to provide the corresponding clocking signals.

Generated at the oscillator apparatus 20 is a first analog signal f(t) which has the frequency of the clocking frequency of the oscillator 22. The first analog signal f(t) is in particular a sine signal or a sinusoidal signal.

Further, derived at the oscillator apparatus 20 is a second analog signal f'(t) which typically also has a sine profile. The second signal is different from the first analog signal and, e.g., is phase-shifted in relation thereto.

In one embodiment, the oscillator apparatus 20 comprises an RC member 25 from which the second analog signal f'(t) is generated, which then has a phase-shift of, e.g., 90° in relation to the first analog signal f(t).

By way of corresponding connectors 26a, 26b, the first analog signal f(t) and the second analog signal f'(t) are provided to the control unit 18.

The oscillator apparatus 20 has a relatively low current draw which in particular is in the range of less than 1 μA. The corresponding energy consumption of the oscillator apparatus 20 is very low.

The clocking signals which are provided at the connectors 24a, 24b by the oscillator apparatus 20 and the first analog signal f and the second analog signal f' are in particular voltage signals.

The control unit 18 has a comparator apparatus 28. Said comparator apparatus 28 comprises a first comparator 30 and a second comparator 32.

An evaluation apparatus 34 (FIG. 1) of the control unit 18 is coupled to the comparator apparatus 28. Said evaluation apparatus 34 may provide an interrupt signal which in particular is asynchronous. The interrupt signal which is provided by the evaluation apparatus 34 (indicated in FIG. 2 by the reference numeral 36) is further processed in the control unit 18.

The first comparator 30 is connected to the oscillator apparatus 20 by way of the connector 26a. The first analog signal f(t) is coupled into the latter.

The second comparator 32 is connected to the oscillator apparatus 20 by way of the connector 26b. The second analog signal f'(t) is coupled into the latter.

The first analog signal and the second analog signal are compared with at least one reference value or reference value range, respectively, at the comparator apparatus 28, wherein the reference value is in particular a voltage value and the reference value range is a voltage value range, respectively.

In one embodiment, provision is made for the first comparator 30 and the second comparator 32 to have the same reference voltage $U_{ref}$.

An electrical device 14 has a sleep mode and an operating mode. The energy consumption is significantly lower in the sleep mode than in the operating mode. The sleep mode is hereby in particular a sleep mode of the control unit 18 and an operating mode is an operating mode of the control unit 18.

When, for example, an electrical device 14 is operated, it is sensible for an operating mode to be provided and a sleep mode in which the energy consumption is significantly reduced. An exact timebase is required for "waking up" the electrical device 14, i.e., for the moment of the transition from the sleep mode into the operating mode.

In principle, such a timebase may be achieved by a fast clocking of the oscillator 22. For example, such a clocking may be on the order of magnitude of one or multiple MHz. A corresponding high-frequency oscillator, however, has a relatively high current draw, for example on the order of magnitude of 100 μA and thus the corresponding electrical device 14 would also have a relatively high energy consumption in the sleep mode.

In the solution in accordance with the invention, the oscillator apparatus 20 has a low-frequency oscillator 22 with correspondingly low energy consumption. In addition, the first analog signal f(t) and/or the second analog signal f'(t) are evaluated, i.e., not only the clocking signals are evaluated (corresponding to zero crossings).

The comparator apparatus 28 enables a configuration of an asynchronous comparator with respect to a threshold. A voltage comparison may be performed, wherein said voltage comparison is continuously performable. Exact wake-up times may thus be achieved with the low-frequency oscillator 22, wherein an accuracy is greater than is achievable only by way of the oscillator 22. The comparator apparatus 28 is integrated into the control unit 18 and in particular the microcontroller and constantly checks for threshold values with minimal energy consumption. A current draw is typically in the range of about 150 nA.

For the electrical device 14, the time is identified for which the electrical device 14 should change into the sleep mode. This evaluation phase occurs in the operating mode (active mode).

First the number of full periods $V_T$ is identified. The period durations are hereby period durations of the clocking signal and of the first analog signal or the second analog signal, respectively, which have the same clocking frequency.

It is then analyzed whether the first analog signal (for example a sine curve) or the second analog signal (for example a cosine curve) is compared with a reference value and in particular reference voltage for an addition remaining waiting time at the wake-up time.

It is then drawn upon as a criterion which corresponding function curve has the greater steepness at the wake-up time.

Further, it is identified whether a sign of a signal profile regarding value increase or value decrease is determined at the comparator apparatus 28 for the triggering of an interrupt signal by the evaluation apparatus 34, i.e., whether a positive edge (inclining edge) or negative edge (declining edge) is used for triggering the interrupt signal.

It is then determined which reference voltage $U_{ref}$ should be supplied at the comparator 28. It is hereby advantageous if the same reference voltage is provided for the first comparator 30 and for the second comparator 32. It is also possible in principle, however, for different reference voltages to be provided for the first comparator 30 and the second comparator 32. The reference voltage is, e.g., calculated or is determined from a look-up table which is stored in particular in the control unit 18.

Corresponding register values are then set in a register 38 of the control unit 18.

In particular, set in the register 38 are values for the voltage reference or voltage references $U_{ref}$, information for the number of full period durations, use of the first analog signal or the second analog signal, use of a positive edge or a negative edge at the comparator apparatus 28.

The register 38 is in connection with the evaluation apparatus 34 or is part of the evaluation apparatus 34. The corresponding register values are entered in the evaluation phase. In the sleep phase, when an interrupt activation occurs and a check occurs in principle, and an interrupt signal may be triggered, the corresponding default values are taken from this register 38.

The control unit 18 is configured such and in particular a reflex system of the control unit 18 is configured such that the expiration of the full period durations $V_T$ activates an interrupt control.

After the evaluation phase, the control unit 18 and thus the electrical device 14 is placed into the sleep mode.

After expiration of the full period durations $V_T$, the reflex system of the control unit 18 becomes active, the interrupt control is activated, and upon reaching corresponding threshold at the comparator apparatus 28, the control unit 18 and thus the electrical device 14 are set into the operating mode.

Figure 4:
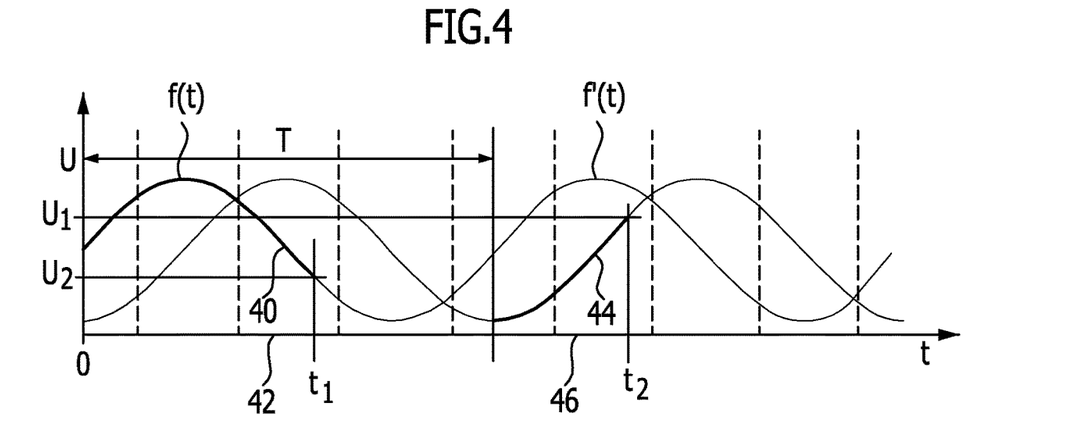
FIG. 4 shows a schematic depiction of a first analog signal f(t) and a second analog signal f'(t) and possibilities for obtaining interrupt signals.

Shown in FIG. 4 with f(t) and f'(t) is, in principle, the profile of the first analog signal and the second analog signal, which are provided to the control unit 18 by the oscillator apparatus 20.

These have the period duration T of the clocking signal which is provided at the connectors 24a, 24b for clocking the control unit 18.

For example, a voltage $U_2$ may be set as a threshold at the comparator apparatus 28.

In one embodiment, this threshold is set at the first comparator 30 with respect to the first analog signal f(t).

Further, it may be checked whether a positive edge (inclining edge) or declining edge (negative edge) is present when reaching the voltage $U_2$ (as $U_{ref}$).

In particular, the signal with the maximum edge steepness 40 in a region 42 is used, which signal serves for the triggering of an interrupt signal by the evaluation apparatus 34.

In this case, at that time $t_1$, which is smaller than one period duration T, the interrupt signal is then triggered by the evaluation apparatus 34, which signal provides for the transition from the sleep mode into the operating mode.

This transition then occurs in a sub-period, i.e., on a smaller timescale than the period duration T; a sub-period wake-up may be achieved despite the use of a low-frequency oscillator 22.

For example, an interrupt triggering at the time t2 may also occur if, e.g., a maximum edge steepness with a positive edge is used for the second analog signal f'(t).

The examples described in conjunction with FIG. 4 are possible setting options which are stored in the register 38 after the evaluation phase in order to appropriately trigger an interrupt signal for waking up the electrical device.

Figure 5:
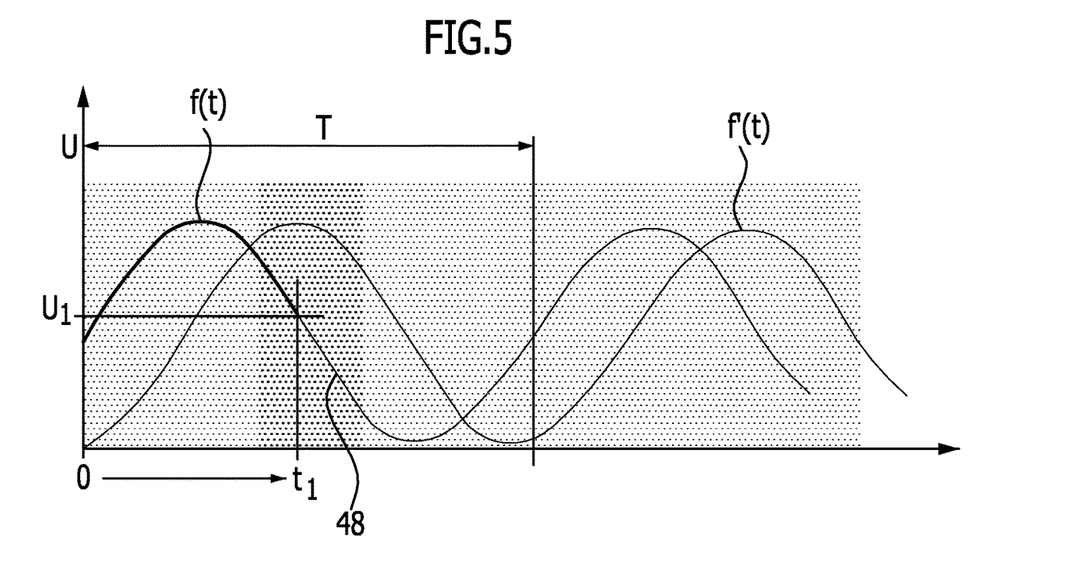
FIG. 5 shows a schematic depiction of a signal profile of a first analog signal and a second analog signal and an embodiment of a possibility for obtaining an interrupt signal.

A further example is shown in FIG. 5 in which a reference voltage $U_1$ of the first comparator 30 is used as a threshold. In this case, an evaluation is performed on the first analog signal f(t).

A declining edge 48 of the first analog signal f(t) is checked for. When the calculated reference voltage is reached, then it results in a time $t_1$ at which the interrupt signal is then triggered.

The time $t_1$ is smaller than the period T.

This case corresponds to the first case previously described based on FIG. 4.

Figure 6:
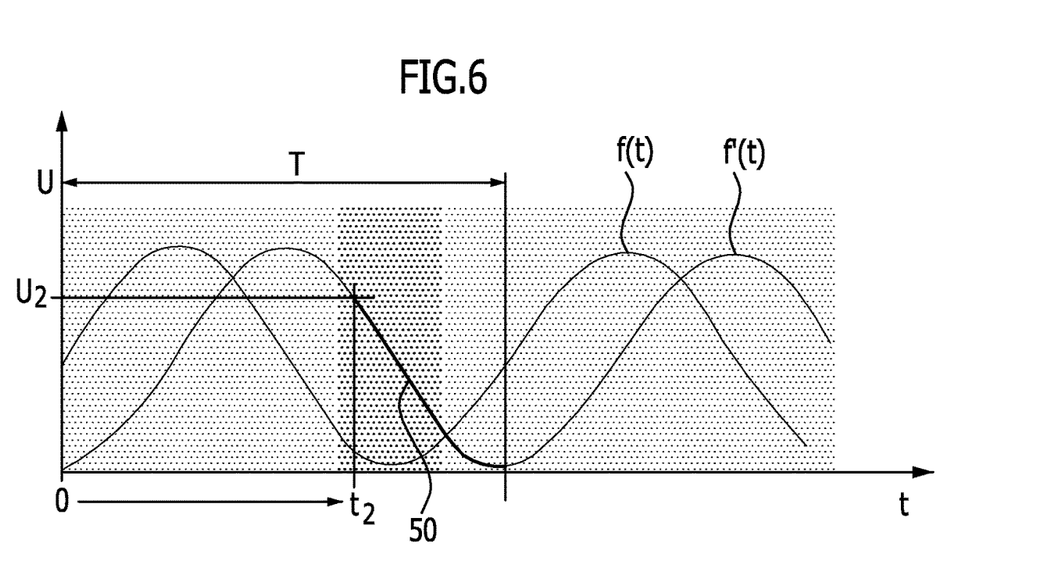
FIG. 6 shows the depiction of signal profiles and a further possibility for obtaining an interrupt signal.

In a further example in accordance with FIG. 6, a time t2 is used for triggering the interrupt signal. A threshold $U_2$ (as a reference voltage) of the second comparator 32, which provides the second analog signal f'(t), is checked for.

In this case, a declining edge 50 is checked for. When a corresponding reference voltage is reached, then correspondingly a time t2 is identified at which the interrupt signal in then triggered by the evaluation apparatus 34.

Figure 7:
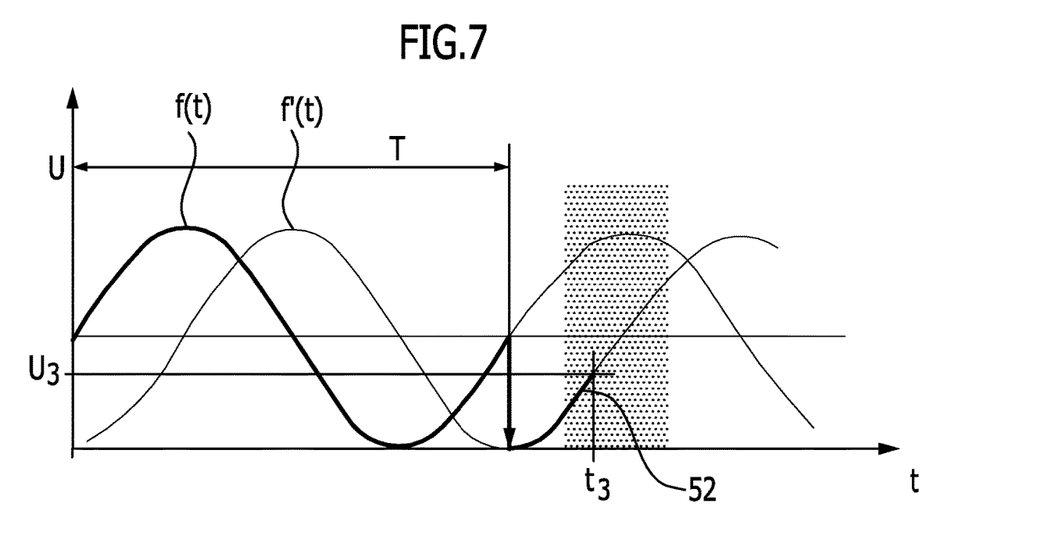
FIG. 7 shows a further signal profile and a further possibility for obtaining an interrupt signal.

An embodiment is shown in FIG. 7 in which the register values are configured such that a time $t_3$ for triggering an interrupt signal in greater than a period T. In this embodiment, the number of full periods $V_T$ is one. In the embodiment shown, the second analog signal f'(t) at the desired wake-up time has a greater edge steepness 52 than the first analog signal f(t).

Therefore, the reaching of a threshold $U_3$ is checked for at the second comparator 32, wherein said threshold is reached after the specified time $t_3$.

In the embodiments in accordance with FIGS. 4, 5, and 6, the number of full periods $V_T$ is zero.

As a result of the solution in accordance with the invention, the energy consumption of the electrical device 14 and thereby in particular of the control unit 18 may be kept low. The solution in accordance with the invention may thereby be used in particular for electrical devices which are operated by way of energy harvesting or by way of batteries like, for example, radio sensors. In particular, the solution in accordance with the invention may advantageously be used in electrical devices 14 which have a low power consumption of typically a few microwatts.

An exact timebase may be provided in order to achieve a transition from a sleep mode into an operating mode at the right time at regular intervals.

A low-frequency oscillator 22 with relatively low energy consumption may hereby be used, wherein a regular triggering of interrupt signals is also possible with a resolution smaller than the clock time T.

The solution in accordance with the invention may be realized in a simple manner on a control unit 18 and in particular with a microcontroller which in particular already has comparators and corresponding connectors for the comparators.

Further, an adjustable voltage reference for the comparators should be present, in particular with a voltage reference which is already integrated in the microcontroller.

Further, in particular an asynchronous interrupt signal should be able to be triggered, which is generated by means of the comparators.

In accordance with the invention, a system is provided, with low power consumption of the control unit 18, in which a highly resolved timebase for waking up the system is generated, i.e., is generated for the transition from the sleep mode into the operating mode, wherein a low-frequency oscillator 22 is usable.

The low-frequency oscillator 22 may always remain switched on due to its relatively low current consumption.

The first analog signal f(t) is preferably directly derived from the oscillator 22. A phase-shifted and in particular 90°-phase-shifted signal, namely the second analog signal f'(t), is derived from the signal of the oscillator 22 by way of the RC member 25.

The analog signals f and f' are provided to the control unit 18 by the oscillator apparatus 20.

A corresponding comparison is performed at the comparator apparatus 28 with low current consumption. In principle, the comparator apparatus 28 may be permanently operated due to the low current consumption, without the core of the control unit 18 and in particular a microcontroller core having to be operated.

In particular, a sub-period measurement is then possible, without an additional clock having to be generated.

In accordance with the invention, provision is made that always that comparator 30 or 32 whose signal has a steeper edge at the corresponding moment is used by the comparator apparatus 28.

Depending on the setting, upon reaching a threshold at the comparator apparatus 28, an increasing or decreasing edge triggers the interrupt signal by way of the evaluation apparatus 34, which signal wakes up the control unit 18 and thus the electrical device 14, i.e., passes the same into the operating mode.

This decision of which comparator 30, 32 of the comparator apparatus 28 is used, which sign of the edge profile is used, and which reference voltage is used, is made or calculated, respectively, prior to initiating the sleep mode.

It is hereby also possible through the solution in accordance with the invention to select the total waiting time (the delay) shorter (FIGS. 4, 5, 6) or longer than a period duration T of the clocking of the oscillator 22.

In a low-frequency oscillator 22 with the frequency 32.768 kHz, the period duration is about 30 µs. As a result of the solution in accordance with the invention, a shorter delay time than 30 µs may be achieved in a sub-period evaluation.

REFERENCE NUMERAL LIST 10 sensor/actuator system
12 base station
14 electrical device
16 control apparatus
18 control unit
20 oscillator apparatus
22 oscillator
24a connector
24b connector
25 RC member
26a connector
26b connector
28 comparator apparatus
30 first comparator
32 second comparator
34 evaluation apparatus
36 interrupt signal
38 register
40 maximum edge steepness
42 region
44 inclining surface 46 region
48 declining surface
50 declining surface
52 edge steepness

What is claimed is:

1. Method for operating an electrical device which has an operating mode and a sleep mode, said method comprising:
   providing by an oscillator apparatus a first analog signal with a first frequency and a second analog signal with a second frequency;
   wherein the second analog signal is different from the first analog signal;
   comparing by a comparator apparatus at least one of the first analog signal and second analog signal with at least one reference value or a reference value range; and
   producing an interrupt signal for transferring from the sleep mode into the operating mode depending on a detected comparison result.

2. Method in accordance with claim 1, wherein the first frequency is the same as the second frequency.

3. Method in accordance with claim 1, wherein the oscillator apparatus provides a clocking signal with a clocking frequency corresponding to at least one of the first frequency and the second frequency.

4. Method in accordance with claim 1, wherein the first analog signal and the second analog signal have a sinusoidal profile.

5. Method in accordance with claim 1, wherein the second analog signal is phase-shifted in relation to the first analog signal.

6. Method in accordance with claim 1, wherein at least one of the first frequency and the second frequency is in the range between 1 kHz and 1 MHz.

7. Method in accordance with claim 3, wherein at the oscillator apparatus the first analog signal and the second analog signal are generated or derived from the clocking signal.

8. Method in accordance with claim 7, wherein at the oscillator apparatus the second analog signal is produced from the clocking signal by way of an RC member.

9. Method in accordance with claim 3, wherein the oscillator apparatus provides the clocking signal to a control unit and provides the first analog signal and the second analog signal to the control unit, wherein the control unit comprises the comparator apparatus.

10. Method in accordance with claim 9, wherein the sleep mode and the operating mode of the electrical device are a sleep mode and an operating mode of the control unit.

11. Method in accordance with claim 1, wherein the comparator apparatus comprises a first comparator for the first analog signal and a second comparator for the second analog signal.

12. Method in accordance with claim 1, wherein upon reaching a threshold value or a threshold value range in the comparator apparatus at least one of (i) an exceeding or falling below the reference value or the reference value range is determined and (ii) a sign of a signal profile regarding value increase or value decrease is determined.

13. Method in accordance with claim 12, wherein at least one of a signal steepness and the sign of the signal profile is taken into account for triggering an interrupt signal.

14. Method in accordance with claim 13, wherein when taking into account the signal steepness, that signal with the higher steepness is used for triggering the interrupt signal.

15. Method in accordance with claim 1, characterized by an evaluation phase in which it is determined in the operating mode after what time the sleep mode should be transitioned into.

16. Method in accordance with claim 15, wherein in the evaluation phase a number of full period durations is identified.

17. Method in accordance with claim 16, wherein it is identified whether at least one of the first analog signal and the second analog signal is used for a waiting time after expiration of the identified number of full periods.

18. Method in accordance with claim 16, wherein it is identified which sign of a signal profile is used.

19. Method in accordance with claim 16, wherein the at least one reference value or reference value range is determined.

20. Method in accordance with claim 16, wherein a control unit is configured such that after expiration of the identified number of full period durations, an interrupt control in activated.

21. Method in accordance with claim 15, wherein after completion of the evaluation phase, the sleep mode is transitioned into.

22. Method in accordance with claim 1, wherein a control unit in the sleep mode is activated after expiration of a certain number of full period durations, wherein the use of interrupt signals is activated and the operating mode is transitioned into as a result of an interrupt signal.

23. Electrical device which has an operating mode and a sleep mode, comprising
   an oscillator apparatus which produces a first analog signal of a first frequency and a second analog signal of a second frequency;
   a control unit to which a clocking signal with at least one of the first frequency and the second frequency of the oscillator apparatus is provided;
   a comparator apparatus which compares at least one of the first analog signal and second analog signal with at least one reference value or a reference value range; and
   an evaluation apparatus which is coupled to the comparator apparatus and provides an interrupt signal for transitioning from the sleep mode into the operating mode depending on comparison results of the comparator apparatus.

24. Electrical device in accordance with claim 23, wherein the first frequency and the second frequency are the same.

25. Electrical device in accordance with claim 23, wherein the oscillator apparatus produces the clocking signal of at least one of the first frequency and the second frequency.

26. Electrical device in accordance with claim 23, wherein the comparator apparatus is integrated into the control unit.

27. Electrical device in accordance with claim 23, wherein the evaluation apparatus is integrated in to the control unit.

28. Electrical device in accordance with claim 23, wherein the control unit is a microcontroller.

29. Electrical device in accordance with claim 23, wherein the oscillator apparatus comprises an RC member which produces the second analog signal.

30. Electrical device in accordance with claim 23, wherein the oscillator apparatus comprises an oscillator crystal for producing the clocking signal.

31. Electrical device in accordance with claim 23, wherein the comparator apparatus has a first comparator for the first analog signal and a second comparator for the second analog signal.

32. Electrical device in accordance with claim 31, wherein the first comparator and the second comparator have the same reference value or the same reference value range.

33. Electrical device in accordance with claim 23, wherein the sleep mode and operating mode of the electrical device is a sleep mode and operating mode of the control unit.

34. Sensor/actuator system which comprises at least one electrical electrical device which has an operating mode and a sleep mode, said electrical device comprising an oscillator apparatus which produces a first analog signal of a first frequency and a second analog signal of a second frequency;

a control unit to which a clocking signal with at least one of the first frequency and the second frequency of the oscillator apparatus is provided;

a comparator apparatus which compares at least one of the first analog signal and second analog signal with at least one reference value or a reference value range; and an evaluation apparatus which is coupled to the comparator apparatus and provides an interrupt signal for transitioning from the sleep mode into the operating mode depending on comparison results of the comparator apparatus; and said electrical device being a sensor or actuator or a hub.

35. Sensor/actuator system in accordance with claim 34, with at least one of (i) the at least one electrical device is controlled by way of radio signals; and (ii) the at least one electrical device provides radio signals.

* * * * *